(12) United States Patent
Gangadhar et al.

(10) Patent No.: US 11,810,381 B2
(45) Date of Patent: Nov. 7, 2023

(54) AUTOMATIC RULE PREDICTION AND GENERATION FOR DOCUMENT CLASSIFICATION AND VALIDATION

(71) Applicant: INTERNATIONAL BUSINESS MACHINES CORPORATION, Armonk, NY (US)

(72) Inventors: Jayanth Gangadhar, Karnataka (IN); Karthick Ramanujam, Chennai (IN); Vivek Venkatanarasaiah, Bangalore (IN); Ullas M. Basavaraj, Bangalore (IN); Ankur Bharatkumar Shah, Surat (IN)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 17/303,914

(22) Filed: Jun. 10, 2021

(65) Prior Publication Data
US 2022/0398397 A1 Dec. 15, 2022

(51) Int. Cl.
*G06F 18/21* (2023.01)
*G06F 18/24* (2023.01)
(Continued)

(52) U.S. Cl.
CPC ........ *G06V 30/413* (2022.01); *G06F 18/2178* (2023.01); *G06F 18/24765* (2023.01); *G06V 10/765* (2022.01); *G06V 30/19153* (2022.01)

(58) Field of Classification Search
CPC ........ G06N 20/00; G06N 3/08; G06N 3/0454; G06N 3/0445; G06N 3/084; G06N 3/09;
(Continued)

(56) References Cited

U.S. PATENT DOCUMENTS

2016/0379139 A1 12/2016 Eldar
2018/0150562 A1 5/2018 Gundimeda
(Continued)

OTHER PUBLICATIONS

Disclosed Anonymously, "Method of efficient result in a system comprising a rules engine by retrieving from a database lookup," IP.com, Jan. 29, 2015, 5 pages, IP.com No. IPCOM000240417D.
(Continued)

*Primary Examiner* — Matthew C Bella
*Assistant Examiner* — Dennis Rosario
(74) *Attorney, Agent, or Firm* — Steven M. Bouknight

(57) ABSTRACT

A method is provided. The method may include, in response to electronically receiving a document, automatically classifying the document and different parts of the document, by electronically identifying a document type associated with the document and electronically tagging data associated with the different parts of the document based on classification rules. The method may further include automatically extracting the tagged data associated with the automatically classified document based on data extraction rules. The method may further include detecting first feedback associated with the classification rules and second feedback associated with the data extraction rules. The method may further include automatically generating and updating validation rules based on the identified document type, the detected first feedback, and the detected second feedback to validate the automatically classified document and the automatically tagged and extracted data.

20 Claims, 6 Drawing Sheets

(51) Int. Cl.
*G06V 30/19* (2022.01)
*G06V 10/764* (2022.01)
*G06V 30/413* (2022.01)

(58) Field of Classification Search
CPC ... G06N 3/0895; G06F 16/93; G06F 16/3329; G06F 16/285; G06F 16/353; G06F 16/35; G06F 16/3344; G06F 30/27; G06F 40/40; G06F 16/355; G06F 16/243; G06F 40/20; G06F 16/906; G06F 3/167; G06F 16/90332; G06F 40/56; G06F 18/2185; G06F 18/217; G06F 18/2178; G06F 18/24; G06F 18/2453; G06F 18/24155; G06F 18/24147; G06F 18/241; G06F 18/24317; G06F 18/24323; G06F 18/2433; G06F 18/24765; G06F 18/21; G06V 30/416; G06V 30/414; G06V 30/413; G06V 30/40; G06V 10/82; G06V 30/418; G06V 30/412; G06V 10/764; G06V 30/19173; G06V 10/765; G06V 40/172; G06V 30/36; G06V 40/1365; G06V 40/197; G06V 10/811; G06V 10/809; G06V 20/698; G06V 30/19107; G06V 30/2253; G06V 30/1985; G06V 30/194; G06V 30/245; G06V 30/244; G06V 30/2445; G06V 30/2455; G06V 30/242; G06V 30/19153; G06V 10/40; G06V 30/41; G06V 30/19127; G06K 9/6218; G06K 9/6268; G06K 9/6267; G06K 9/628; G06K 9/6278; G06K 9/00536; G06K 9/6293; G06K 9/626; G06K 9/6292; G06T 2207/20081; G06T 11/60; G06T 2207/20084

See application file for complete search history.

(56) References Cited

U.S. PATENT DOCUMENTS

| | | |
|---|---|---|
| 2019/0147103 A1 | 5/2019 | Bhowan |
| 2020/0280565 A1* | 9/2020 | Rogynskyy ......... H04L 67/1095 |
| 2020/0334020 A1 | 10/2020 | Seetharaman |
| 2021/0081566 A1* | 3/2021 | Broudou .............. G06V 30/416 |

OTHER PUBLICATIONS

Disclosed Anonymously, "Method to integrate constraints programming in a rule-based system," IP.com No. IPCOM000224148D, Dec. 11, 2012, pp. 1-6.

Mell, et al., "The NIST Definition of Cloud Computing", National Institute of Standards and Technology, Special Publication 800-145, Sep. 2011, 7 pages.

* cited by examiner

AUTOMATIC RULE PREDICTION AND GENERATION FOR DOCUMENT CLASSIFICATION AND VALIDATION

BACKGROUND

The present invention relates generally to the field of computing, and more specifically, to automatic and cognitive data processing and management based on adaptive rules.

Generally, document identification and classification is the act of labeling—or tagging—documents and/or content within documents using categories depending on their content. Specifically, classifying large volumes of documents and content within documents is essential to make data more manageable and to obtain valuable insights into data. The documents and content to be classified may include texts, images, music, etc., with each kind of document possessing its own special classification problem. Hence, automatic document classification has been a prominent process for classifying content in a faster, more cost-efficient, and more accurate way. Specifically, using automated techniques such as Natural Language Processing (NLP) and other algorithms, huge amounts of content associated with documents may be automatically assigned to one or more categories and the data associated with the content may be more accurately ingested. Documents may be classified according to their subjects or according to other attributes (such as document type, author, printing year etc.). Typically, the document identification and classification process involves multiple steps such as template creation, identification, and recognition before it is put to use for production.

SUMMARY

A method is provided. The method may include, in response to electronically receiving a document, automatically classifying the document and different parts of the document, wherein automatically classifying the document comprises electronically identifying a document type associated with the document and electronically tagging data associated with the different parts of the document based on one or more classification rules pertaining to the identified document type and identified data type in the document. The method may further include automatically extracting the tagged data associated with the automatically classified document based on one or more data extraction rules associated with the identified document type and the identified data type. The method may further include detecting first feedback associated with the one or more classification rules and second feedback associated with the one or more data extraction rules. The method may further include automatically generating and updating validation rules based on the identified document type, the detected first feedback, and the detected second feedback to validate the automatically classified document and the automatically tagged and extracted data.

A computer system is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include, in response to electronically receiving a document, automatically classifying the document and different parts of the document, wherein automatically classifying the document comprises electronically identifying a document type associated with the document and electronically tagging data associated with the different parts of the document based on one or more classification rules pertaining to the identified document type and identified data type in the document. The method may further include automatically extracting the tagged data associated with the automatically classified document based on one or more data extraction rules associated with the identified document type and the identified data type. The method may further include detecting first feedback associated with the one or more classification rules and second feedback associated with the one or more data extraction rules. The method may further include automatically generating and updating validation rules based on the identified document type, the detected first feedback, and the detected second feedback to validate the automatically classified document and the automatically tagged and extracted data.

A computer program product is provided. The computer program product may include one or more computer-readable storage devices and program instructions stored on at least one of the one or more tangible storage devices, the program instructions executable by a processor. The computer program product may include program instructions to, The computer program product may include program instructions to, in response to electronically receiving a document, automatically classify the document and different parts of the document, wherein automatically classifying the document comprises electronically identifying a document type associated with the document and electronically tagging data associated with the different parts of the document based on one or more classification rules pertaining to the identified document type and identified data type in the document. The computer program product may also include program instructions to automatically extract the tagged data associated with the automatically classified document based on one or more data extraction rules associated with the identified document type and the identified data type. The computer program product may further include program instructions to detect first feedback associated with the one or more classification rules and second feedback associated with the one or more data extraction rules. The computer program product may include program instructions to automatically generate and update validation rules based on the identified document type, the detected first feedback, and the detected second feedback to validate the automatically classified document and the automatically tagged and extracted data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
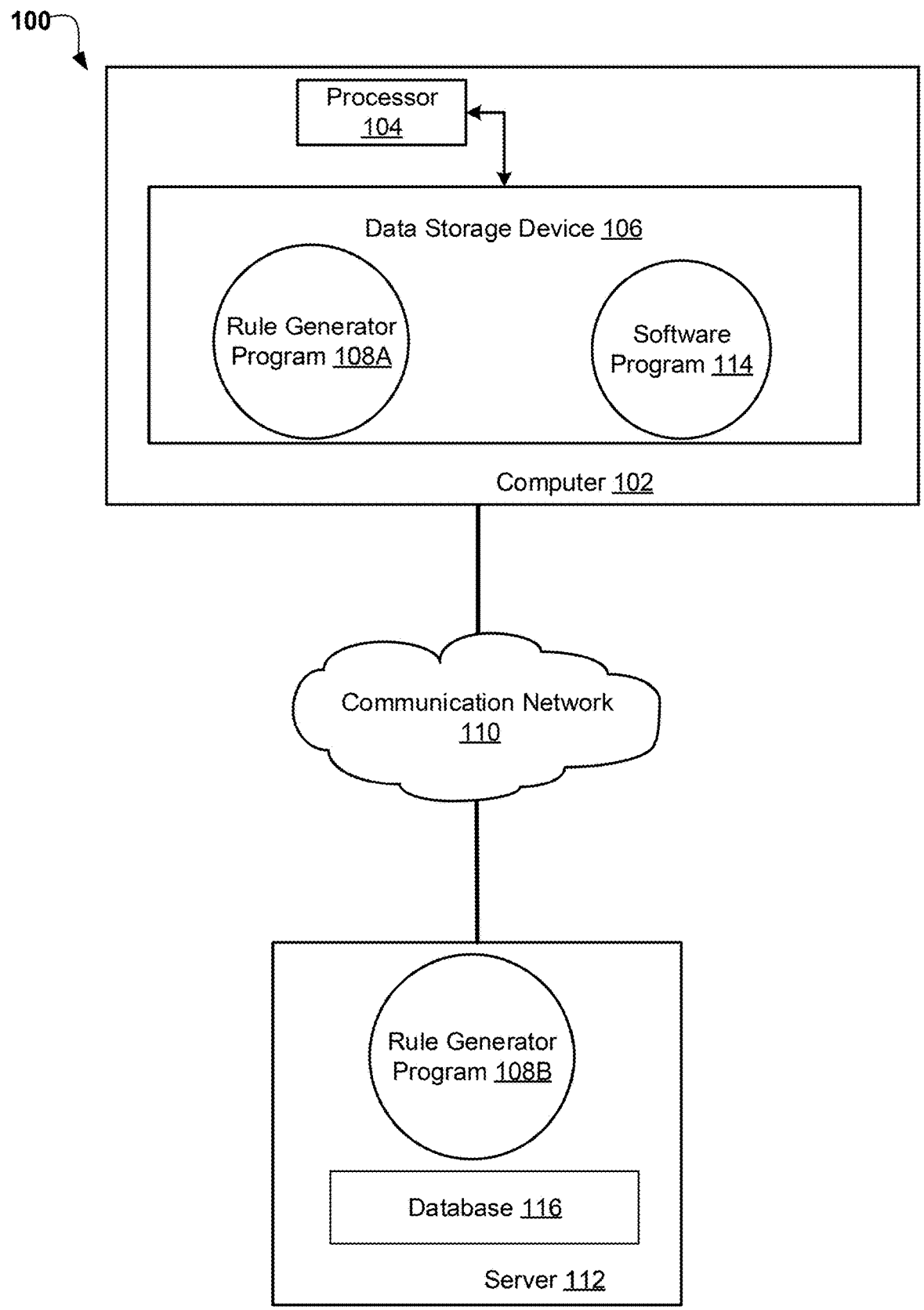
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to data processing and management. The following described exemplary embodiments provide a system, method and program product for automatically and predictively generating and/or updating rules for document classification, extraction, and validation according to one embodiment. Specifically, the present embodiment has the capacity to improve the technical field associated with document classification by automatically defining and processing classification, extraction, and validation rules, as well as updating/modifying the rules. More specifically, the system, method and program product may use a combination of a natural language processing, machine learning, and deep learning algorithms for predicting and generating the rules for a rules-based model associated with document classification, extraction, and validation.

As previously described with respect to document classification, typically the document classification process involves multiple steps such as template creation, data identification, recognition, extraction, and validation. For example, template creation involves a selection of multiple sample documents for identification and recognition of fields within the document. Thereafter, the field data may be used for identification of the document type as well as for the recognition of the fields and metadata in future ingested documents. Then, data extraction may be used to identify and extract specific information of interest from a specific document type and/or specific field. Additionally, a manual validation process may also be used to validate the recognized fields and extracted data from the recognized fields to determine whether one or more classifications of data are accurate as well as to determine whether the data is accurate.

One of the main approaches for performing document classification and extraction is based on a rule-based approach. More specifically, following one or more rules and patterns—based on morphology, lexis, syntax, semantics, and phonology—models will automatically tag texts and other content associated with a document. A set of rules is typically manually and set by one or more individuals and may collectively make up a model. However, while a rule-based system has its advantages, on the negative side, creating the rule-based model can be complex, time-consuming, and hard to scale, in that, one would have to add new rules or change existing rules every time the system encounters and/or needs to analyze a new type of document and/or new content within a document. Specifically, changing a set of rules for document classification and extraction, and generating and/or updating rules for validation is difficult and more tedious when large and different amounts of documents types may be ever-growing and ever-changing. For example, new document types may continue to grow and change as emerging industries, new companies, and new ways of doing business grows and changes. Furthermore, for example, while one field of data in a given document or industry may have been called or labeled one thing during a given time, that field of data may in time be labeled or called an entirely different thing based on industry changes. Also, for example, a field may be called one thing in one type document/industry but called an entirely different thing in another type document/industry. Thus, while certain parts of the process may be manually performed, a combination of machine learning tools and algorithms provides a faster, less biased, and more scalable option for automatically generating, suggesting and executing rules for document identification, classification, and validation.

As such, it may be advantageous, among other things, to provide a method, computer system, and computer program product for automatically and predictively generating and/or updating rules for document classification and extraction, and more specifically, for document validation. Specifically, the method, computer system, and computer program product may use a combination of a natural language processing, machine learning, and deep learning algorithms for predicting and generating the rules for a rules-based model for document classification, extraction, and validation. More specifically, in predicting and generating the rules, the method, computer system, and computer program product may use the natural language processing, machine learning, and deep learning algorithms to identify similar types of documents and data to a received type document based on one or more attributes associated with the received type of document, identify rules associated with the identified similar types of documents based on the one or more attributes associated with the received type of document, and use the identified rules as well as received feedback to automatically and cognitively generate and/or predict a rule or set of rules for the classification, extraction, and validation of the received type of document.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, an exemplary networked computer environment 100 in accordance with one embodiment is depicted. The networked computer environment 100 may include a computer 102 with a processor 104 and a data storage device 106 that is enabled to run a rule generator program 108A and a software program 114 and may also include a microphone (not shown). The software program 114 may be an application program such as an internet browser and/or one or more mobile apps running on a client computer 102, such as a mobile phone device. The rule generator program 108A may communicate with the software program 114. The networked computer environment 100 may also include a server 112 that is enabled to run a rule generator program 108B and the communication network 110. The networked computer environment 100 may include a plurality of computers 102 and servers 112, only one of which is shown for illustrative brevity. For example, the plurality of computers 102 may include a plurality of interconnected devices, such as a mobile phone, tablet, and laptop, associated with one or more users.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the rule generator program 108A, 108B may interact with a database 116 that may be embedded in various storage devices, such as, but not limited to, a mobile device 102, a networked server 112, or a cloud storage service.

According to the present embodiment, a program, such as a rule generator program 108A and 108B may run on the client computer 102 and/or on the server computer 112 via a communications network 110. The rule generator program 108A, 108B may generate and/or update rules associated with the computer-implemented process for document classification, extraction and validation. Specifically, a user using a client computer 102 may run a rule generator program 108A, 108B, that may interact with a database 116 and a software program 114, to automatically and predictively generate rules for document classification, extraction, and validation. More specifically, the rule generator program 108A, 108B may use a combination of a natural language processing, machine learning, and deep learning algorithms for predicting and generating the rules for a rules-based model for document classification, extraction, and validation. In predicting and generating the rules, the rule generator program 108A, 108B may use the natural language processing, machine learning, and deep learning algorithms to identify similar types of documents and data for a received type of document based on one or more attributes associated with the received type document, identify rules associated with the identified similar types of documents and data based on the one or more attributes associated with the received type of document, and use the identified rules as well as received feedback to automatically and cognitively generate and/or predict a rule or set of rules for governing the classification, extraction, and validation of the received type of document.

Figure 2:
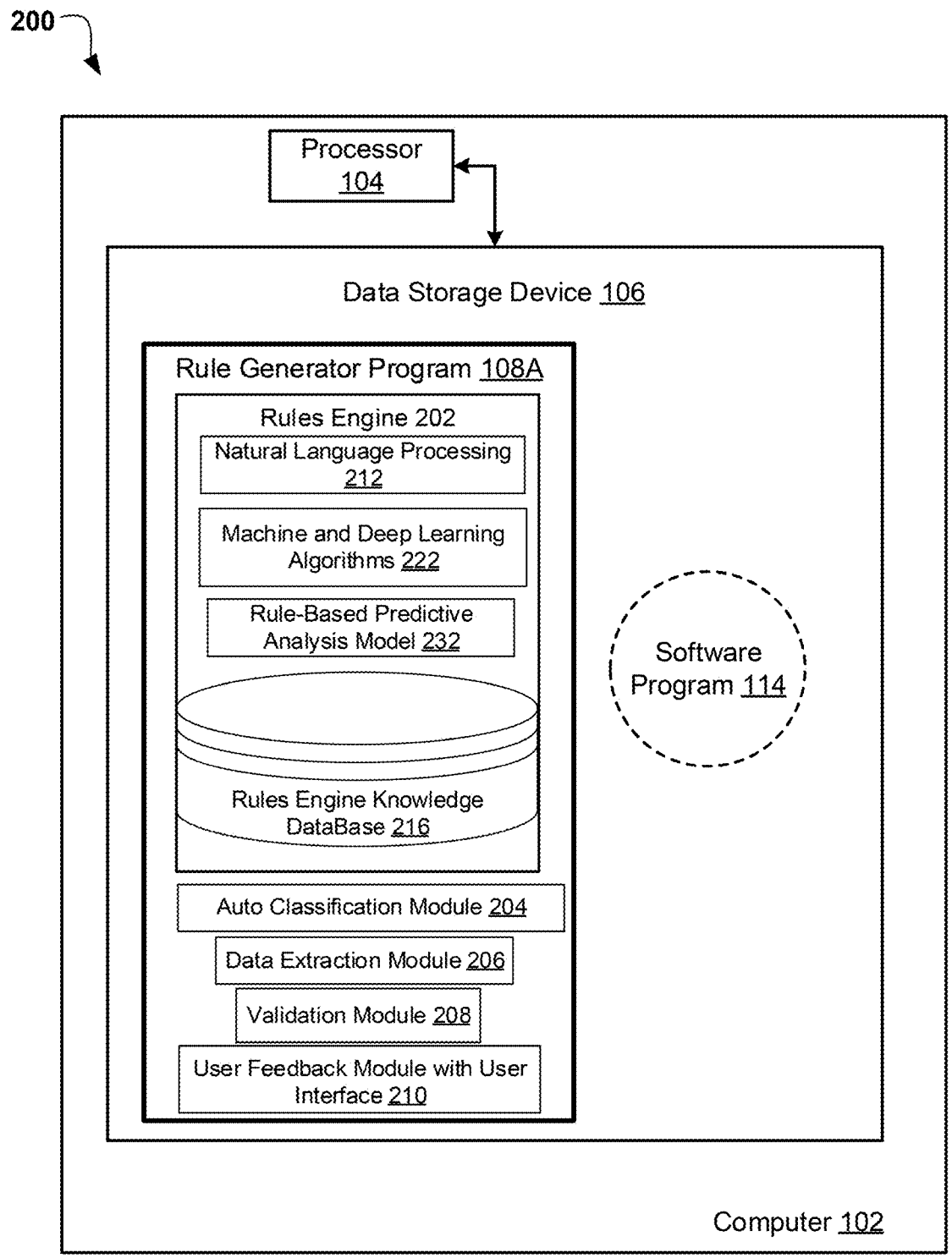
FIG. 2 is a block diagram illustrating the system architecture of a rule generator program according to one embodiment.

Referring now to FIG. 2, a block diagram illustrating a system architecture for the rule generator program 108A, 108B according to one embodiment is depicted. As previously described, the rule generator program 108A, 108B may run on the client computer 102 (FIG. 1) and/or the server computer 112 (FIG. 1). For illustrative brevity, only an expanded view of the system architecture of the rule generator program 108A (FIG. 1) running on client computer 102 is shown in FIG. 2. As illustrated in FIG. 2, the rule generator program 108A may include computer-implemented components such as a rules engine module 202, an auto classification module 204, a data extraction module 206, a validation module 208, a user feedback module with a user interface 210, and a rules engine knowledge database 216. Each of the different components may interact with each other. As previously described, the rule generator program 108A, 108B may use a combination of natural language processing, machine learning, and deep learning algorithms for predicting and generating and/or rules for document classification, extraction, and validation. As depicted in FIG. 2, the rules engine 202 may include the natural language processing (NLP) algorithms 212 as well as the machine learning and deep learning algorithms 222. The rules engine 202 may also include a rules engine knowledge database 216. According to one embodiment, the rules engine knowledge database 216 may include different types of sample documents (i.e. document templates) for classifying and extracting data from electronically received/ingested documents that are identified as similar to the sample documents. Furthermore, according to one embodiment, the rules engine knowledge database 216 may include an initial set of classification rules, extraction rules, and validation rules that may be defined as part of the rules engine knowledge database 216 based on initial input from a user. Therefore, the rule engine knowledge database 216 may include existing rules for classifying, extracting, and validating data associated with a document.

The natural language processing (NLP) algorithms 212 as well as the machine learning and deep learning algorithms 222 may be used to learn from information associated with incoming and ingested documents as well as make decisions based on the learned information and feedback received from users. For example, the natural language processing algorithms 212 may be used to identify data associated with the documents. The machine/deep learning algorithms 222 may be used to parse the identified data and learn from that data to provide suggestions on classifying and extracting the data based on the classification rules and the extraction rules. Furthermore, the machine/deep learning algorithms 222, which may include a structure of algorithms in layers that create an artificial neural network, may be used to receive any provided feedback related to the classification and extraction suggestions.

Specifically, and as previously described, the rule generator program 108A, 108B may also include the user feedback module 210. The user feedback module 210 may be used to receive feedback from a user regarding rule suggestions for classifying, extracting, and validating data. More specifically, the user feedback may include an indication from a user that the user accepts, rejects, or wants to edit a rule and/or rule suggestion for classifying, extracting, and/or validating the data. Accordingly, the user feedback module 210 may include a user interface for receiving the user feedback. For example, the user interface may include a dialog box that prompts a user using graphical control elements, such as an accept button and a reject button, to enable a user to accept or reject a rule and/or rule suggestion for classifying, extracting, and/or validating a document and data associated with a document. The rules engine 202 may receive the user feedback and based on the user feedback and other information/attributes learned from received documents, the rule generator program 108A, 108B may continuously/dynamically generate rules and propose updated rules for different types of documents and document sets to be processed. Therefore, and as will be further described in FIG. 3, the rule generator program 108A, 108B may continuously monitor the user feedback in generating and suggesting rules.

In turn, the deep learning algorithms 222 may be used to take user feedback and generate and suggest new rules (i.e. classification rules, extraction rules, and validation rules), and/or update existing rules in the rules engine knowledge database 216. The rules engine 202 may also include a rule-based predictive analysis model 232 which may be used to apply the learned rules (i.e. existing rules, generated rules, and updated rules) from the machine/deep learning algorithms 222, and/or make predictive suggestions on which rules to apply to the received documents based on the type of document and type of data within the document. Therefore, the rules engine 202 may interact with the auto classification module 204 to auto classify incoming documents and content within documents based on the classification rules/suggestions from the rules engine knowledge database 216. The rules engine 202 may also interact with the data extraction module 206 to extract data based on the extraction rules/suggestions from the rules engine knowledge database 216. Additionally, the rules engine 202 may also interact with the validation module 208 to generate and update validation rules for validating the classification and extraction of the data based on the validation rules/suggestions from the rules engine knowledge database 216.

Figure 3:
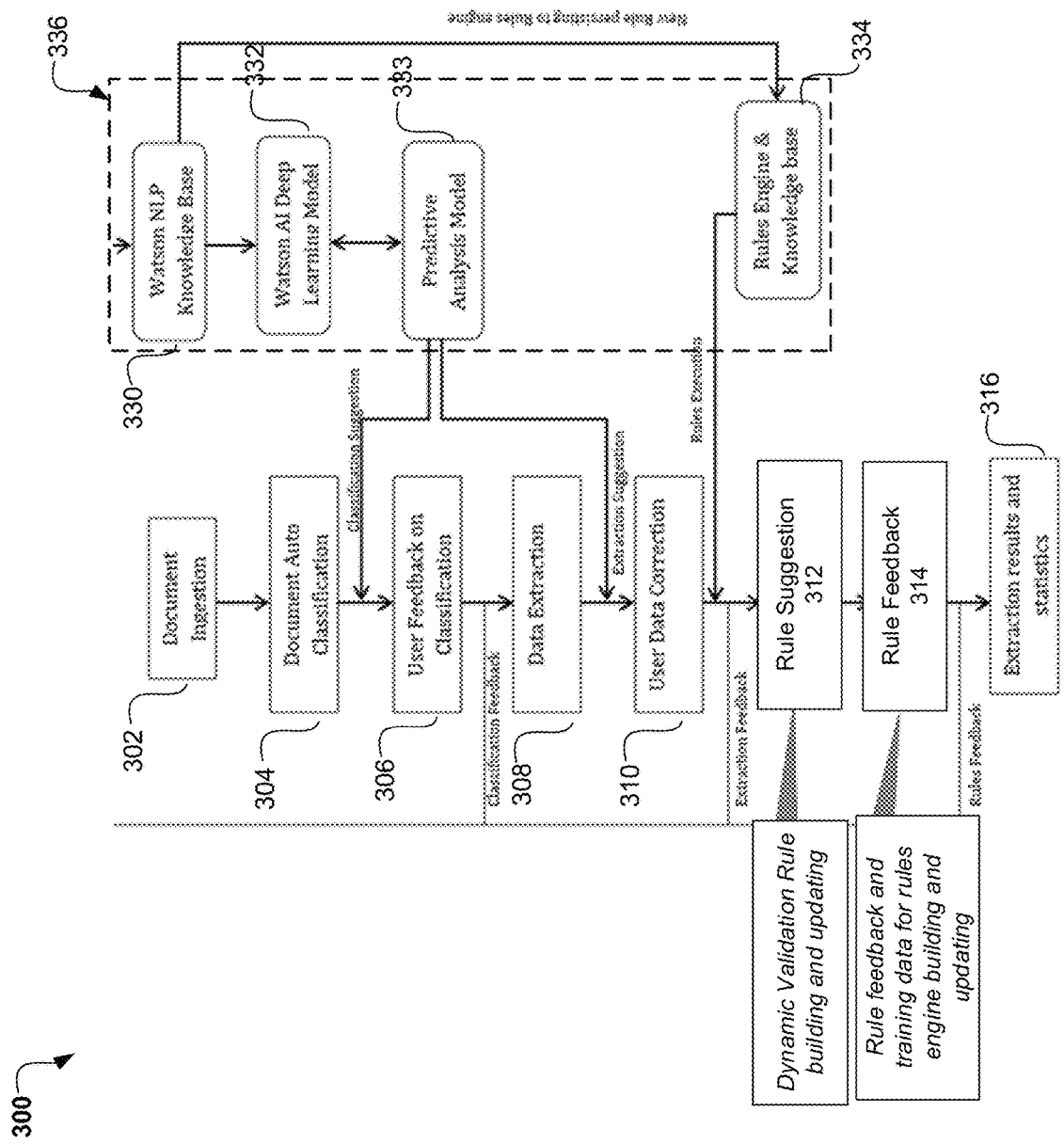
FIG. 3 is an operational flowchart illustrating the steps carried out by a program for automatically and predictively generating and/or updating rules for document classification, extraction, and validation according to one embodiment.

Referring now to FIG. 3, an operational flowchart 300 illustrating the steps carried out by a program for automatically and predictively generating and updating rules for document classification, extraction, and validation according to one embodiment is depicted. Specifically, at 302, the rule generator program 108A, 108B (FIG. 1) may electronically receive and/or ingest incoming documents and/or sets of documents. For example, a document set may include documents related to an online transaction, whereby the document set includes one or more invoice documents and one or more purchase order documents.

Thereafter, at 304, the rule generator program 108A, 108B (FIG. 1) may begin a process for auto-classifying the received document and/or set of documents. Specifically, the rule generator program 108A, 108B (FIG. 1) may auto-classify the received document and/or document set based on one or more classification rules from the rules engine 336 for classifying a type of the received document and a type of data within the received document, whereby auto-classifying may include tagging/labeling the type of document as well as tagging/labeling text, fields, symbols, and other objects within the document using defined tags. As previously described with respect to FIG. 2 and now depicted in FIG. 3, the rules engine 336 may include natural language processing (NLP) algorithms 330 as well as machine learning and deep learning algorithms 332 for identify data associated with a document. The rules engine 336 may also include a rules engine knowledge database 334 whereby, according to one embodiment, the rules engine knowledge database 334 may include different classification rules for classifying data according to the type of document and document data to be processed. Specifically, an initial set of classification rules may be defined based on sample data from documents stored on the rules engine knowledge database 334. Therefore, for example, certain classification rules may apply to an invoice document when auto-classifying data associated with an invoice. Furthermore, and as previously described, the natural language processing algorithms 330 and machine learning and deep learning algorithms 332 may be used to identify and learn from identified data associated with the documents.

Thus, following the example of the online transaction, the rule generator program 108A, 108B (FIG. 1) may identify that a document from the set of documents of an online transaction includes an invoice document by detecting a similar stored sample document and/or detecting text that reads "invoice number" and a header that reads "Invoice." The rule generator program 108A, 108B (FIG. 1) may also identify data using metadata, regex patterns, values detected in a document, etc. Furthermore, the rule generator program 108A, 108B (FIG. 1) may detect classification rules pertaining to invoice documents within the rule engine knowledge database 334 to classify/label the data in the invoice document. Specifically, the classification rules may be used to determine how to classify a type of document and data within the type of document. Therefore, in response to detecting that the document is an invoice document, the rule generator program 108A, 108B (FIG. 1) may suggest and apply the classification rules associated with an invoice document for auto-classifying the invoice document as well as auto-classifying the data within the invoice document. For example, the rule generator program 108A, 108B (FIG. 1) may auto-classify and tag a number in the invoice document as an invoice number based on similarly stored sample/template documents and/or based on a detection that the number is in a field that reads "invoice number." Additionally, for example, the rule generator program 108A, 108B may use the classification rules to classify/label an invoice amount, invoice date, purchase order number, currency (USD), etc.

According to one embodiment, the rule generator program 108A, 108B (FIG. 1) may also provide a suggestion of one or more classification rules for a received document type and/or received type of data within a document. The classification rule suggestion may include a suggestion on how to classify a type of document and types of data within the document According to one embodiment, the rule generator program 108A, 108B (FIG. 1) may use the rules engine 336 to detect a document type and data type of data within a document and suggest rules for classifying the document type and data type based on a percentage threshold. For example, in response to receiving a given document type and/or type of data within a document, the rule generator program 108A, 108B (FIG. 1) may search for and identify data stored on the rules engine knowledge database 334 that matches the data associated with the document. According to one embodiment, a data match may be based on a percentage threshold rule such as, only stored data which is considered to be a greater than 75% match to the document data may be identified as matching data. For example, using the rules engine 336, the rule generator program 108A, 108B (FIG. 1) may determine that one or more types of data that is stored on the rules engine knowledge database 334 has a greater than 75% match to the identified type of data associated with a received document. When determining a match (and corresponding classification rules), the rule generator program 108A, 108B (FIG. 1) may also consider a type of industry associated with the document, document metadata relative to the industry, a geography of the industry associated with the document, currency being transacted within the document, an area of business done by the company associated with the document, and specific values in the document. In turn, the rule generator program 108A, 108B (FIG. 1) may determine/suggest one or more classification rules that correspond to the stored data that matches the data for a given/received type of document (or more specifically, the type of data within the document). According to one embodiment, the rule generator program 108A, 108B (FIG. 1) may automatically apply the classification rule associated with the highest/closest matching stored data type (i.e. the highest in percentage) that matches the data in or associated with a document.

Furthermore, according to one embodiment, the rule generator program 108A, 108B (FIG. 1) may also detect/receive feedback regarding a suggested and/or applied classification rules. Specifically, according to one embodiment and as depicted at 306 in FIG. 3, the detected feedback may include a selection of a classification rule (from multiple suggested classification rule) and/or an approval/rejection of a classification rule. For example, and as previously described, the rule generator program 108A, 108B (FIG. 1) may include a user feedback module 210 (FIG. 2) which may be used to receive feedback from a user regarding suggestions for classifying, extracting, and validating data. More specifically, the user feedback may include an indication from a user that the user accepts, rejects, or wants to edit a rule and/or rule suggestion for classifying data. Accordingly, the user feedback module 210 (FIG. 2) may include a user interface for receiving the user feedback. For example, the user interface may include a dialog box that prompts a user using graphical control elements, such as an accept button and a reject button, to enable a user to accept or reject a rule and/or rule suggestion for classifying data associated with a document. The rules engine 336 may receive the user feedback, and based on the user feedback and other information/attributes learned from the type of document (such as type of industry, originating geography of the document, etc.), the rule generator program 108A, 108B may dynamically train the machine learning and deep learning algorithms 332 (as well as the rule-based predictive analysis model 333) to update and apply the classification rule for similar document types and/or similar data types within a document. Thus, the accepted classification rules for a given type of document may be promoted and stored in the rules engine knowledge database 334 and used to train the rules engine 336 while the rejected classification rules may be discarded. In turn, the rules engine 336 may continuously and dynamically learn from and apply any feedback associated with the generating/suggestion of classification rules. In turn, the rule generator program 108A, 108B (FIG. 1) may generate, update, and/or associate a classification rule for a given received type of document.

Thereafter, at 308, the rule generator program 108A, 108B (FIG. 1) may extract data from a document based on the auto-classification of the document and detected feedback. For example, and as previously described, the rule generator program 108A, 108B (FIG. 1) may auto-classify and tag a number as an invoice number based on similar stored sample document and/or a detection that the number is in a field that reads "invoice number." In turn, the rule generator program 108A, 108B (FIG. 1) may extract the invoice number for further processing (and/or storing in a database) using data extraction rules that are associated an invoice document. In some cases, a classification rule may include a corresponding data extraction rule based on the identified type of document and/or type of data associated with the document. Also, in some cases, a classification rule may have more than one corresponding data extraction rule. According to one embodiment, the rule generator program 108A, 108B (FIG. 1) may suggest one or more data extraction rules based on the auto-classification of the received document and the determination of how close data stored on the rules engine knowledge database 334 matches the identified data associated with the classified type of document. For example, certain data extraction rules may apply to specific types of data within a classified document. The data extraction rules may determine how and/or what types of data is extracted from certain types of documents. Thus, the rule generator program 108A, 108B (FIG. 1) may suggest data extraction rules based on a determination of whether data that corresponds to a data extraction rule matches a type of data corresponding to a document. In turn, the rule generator program 108A, 108B (FIG. 1) may determine/suggest one or more matching data extraction rules for a given type of document and type of data associated with the document based on stored information corresponding to a data extraction rule that closely matches the data for the given type of document. According to one embodiment, the rule generator program 108A, 108B (FIG. 1) may automatically apply the data extraction rule associated with the highest/closest matching data type (i.e. the highest in percentage) to data in a document. For example, based on data extraction rules, the rule generator program 108A, 108B (FIG. 1) may determine to extract the classified data including the invoice amount, invoice date, purchase order number, and product number, but not extract the product description.

Furthermore, the rule generator program 108A, 108B (FIG. 1) may also detect/receive feedback regarding a data extraction rule as well as detect data corrections to extracted data. Specifically, according to one embodiment, the rule generator program 108A, 108B (FIG. 1) may suggest one or more data extraction rules as previously described, and the detected feedback may include a selection of a data extraction rule from the one or more suggested data extraction rules and/or an approval/rejection of a data extraction rule. For example, and as previously described, the rule generator program 108A, 108B (FIG. 1) may include a user feedback module 210 (FIG. 2) which may be used to receive feedback from a user regarding suggestions for extracting data. In turn, the rules engine 336 may receive the user feedback, and based on the user feedback and other information/attributes learned from the ingested document (such as type of industry, originating geography of the document, etc.), the rule generator program 108A, 108B may dynamically update (and/or generate) and apply the data extraction rule to similar document types and/or to similar data associated with a document using the machine learning and deep learning algorithms 332 as well as the rule-based predictive analysis model 333. Additionally, and as depicted at 310 in FIG. 3, the rule generator program 108A, 108B may detect any data corrections to the data that is extracted. For example, in the case of the document set that includes an invoice document and a purchase order document, data associated with the document set may be classified and extracted according to the processes for classification and data extraction described above. However, the rule generator program 108A, 108B may detect/receive feedback from user feedback module 210 (FIG. 2) whereby in the feedback a user may have determined that a product number in the invoice is longer than it should be, and based on a comparison between the invoice document and the purchase order document, the rule generator program 108A, 108B may detect that the feedback includes a data correction of the product number in the invoice whereby the corrected product number in the invoice document now matches the product number from the purchase order. Other data corrections may include lexical corrections user performs on the extracted data and contextual corrections on the document. According to one embodiment, the rule generator program 108A, 108B may record changes/correction history and analyze using rules engine 336.

Then, at 312, based on the classification rules, the data extraction rules, and any detected feedback with respect to the classification rules and the data extraction rule for a given type of document and/or type of data (including detected data corrections), the rule generator program 108A, 108B (FIG. 1) may dynamically generate (and/or update) one or more validation rules for validating the identified data (as well as validating the classification and extraction of the identified data) for the received type of document and/or document set. Specifically, and as previously described, the data validation process may include an automatic computer-implemented check to ensure that data extracted and entered from a document and/or document set (for example, entered into a database) is sensible and accurate. Similar to the classification and extraction process, when generating validation rule suggestions, the rule generator program 108A, 108B (FIG. 1) may take into account considerations such as the type of industry associated with the document(s), the area of business done by the company associated with the document(s), document metadata and the relativity of the metadata to the industry/business, the originating geography associated with the document(s), the currency being transacted within the document(s), and the specific values in the document(s).

As previously described, initial validation rules may be defined as part of the rules engine knowledge database 334. Therefore, the rule generator program 108A, 108B (FIG. 1) may search for and identify validation rules governing a particular type of document and/or document set. Similar to the identification of the classification rules and the data extraction rules, the rule generator program 108A, 108B (FIG. 1) may identify matching validation rules based on a determination of how close data stored on the rules engine knowledge database 334 matches the identified data associated with the classified type of document. For example, the rule generator program 108A, 108B (FIG. 1) may identify and capture closely matching validation rules for a given type of document and/or document set, whereby the validation rules may be further filtered based on the type of industry associated with the document, originating geography of the document, type currency being transacted in the document, and other information associated with the document and/or set of documents (which may be identified by natural language processing and machine learning algorithms).

However, based on detected feedback with regard to the classification and data extraction process, as well as detected data corrections, the rule generator program 108A, 108B (FIG. 1) may automatically and dynamically generate and/or update one or more validation rules for validating the identified data (and the classification and extraction of such data) for a given type of document and/or document set. For example, and as previously described with respect to the document set that includes an invoice document and a purchase order document, the rule generator program 108A, 108B (FIG. 1) may classify and extract an invoice number from each of the invoice document and the purchase order document. The rule generator program 108A, 108B (FIG. 1) may also detect the feedback that included a detected data correction of the product number in the invoice whereby the product number in the invoice document is corrected by a user to match the product number from the purchase order. Therefore, based in part on the data correction, a validation rule may be generated that includes computer-implemented language to check and ensure that: the product number in the invoice should match the product number in the purchase order, defer to the product number in the purchase order when the product number in the invoice is incorrect and vice versa, and take corrective action. Furthermore, based on the classification data, the extraction data, other feedback, and other considerations such as a type of industry associated with the document set, additional examples of generated validation rules may include:

Scenario 1: For ingesting multiple invoices against one purchase order
    Rule 1: Total of invoice amount across multiple invoices should be equal to the amount in the purchase order.
    Rule 2: Currency in invoice and purchase order should match else there needs to be a currency conversion executed (for e.g.: USD & INR).
    Rule 3: Goods being transported should be same in invoice and purchase order else there needs to be a flag raised when different.

Scenario 2: For ingesting transactions involving import license and travel documents
    Rule 1: Importer should have the valid license to import the specific product. Validity of the license to be verified against government portal, issue date, and type of product.
    Rule 2: Valid documents being attached with the transaction, if any relevant document missed, then raise a flag.
    Rule 3: Product and quantity involved within the import license should match with the travel documents and within permitted limits.

Therefore, the rule generator program 108A, 108B (FIG. 1) may dynamically generate validation rules for validating identified data from a document and/or document set. Similar to the feedback received for the classification rule suggestions and data extraction rule suggestions, the rule generator program 108A, 108B (FIG. 1) may also detect/receive feedback regarding a validation rule suggestion. Specifically, according to one embodiment and as depicted at 314 in FIG. 3, the rule generator program 108A, 108B (FIG. 1) may suggest one or more validation rules as previously described, and the detected feedback may include an approval or rejection of a suggested validation rule. For example, and as previously described, the rule generator program 108A, 108B (FIG. 1) may include a user feedback module 210 (FIG. 2) which may be used to receive feedback from a user regarding suggestions for validation rules. More specifically, the user feedback may include an indication from a user that the user accepts, rejects, or wants to edit a validation rule and/or rule suggestion for validating data. The rules engine 336 may receive the user feedback, and based on the user feedback and other described information/attributes learned from the received/ingested document (such as type of industry, originating geography of the document, etc.), the rule generator program 108A, 108B may dynamically update and apply the validation rule for similar document types and/or similar information within a document using the machine learning and deep learning algorithms 332 as well as the rule-based predictive analysis model 333. The accepted validation rules may be promoted and stored in rules engine knowledge database 334 and used to train the rules engine 336 while the rejected validation rules may be discarded. The rules engine 336 may continuously and dynamically learn from and apply any feedback when generating/suggesting the validation rules. Furthermore, the rules engine 336 may be used to associate the generated validation rules with a given document type as well as with the type of industry associated with the document(s), the area of business done by the company associated with the document(s), document metadata and the relativity of the metadata to the industry/business, the originating geography of the industry associated with the document(s), the currency being transacted within the document(s), and the specific values in the document(s).

In turn, at 316, the rule generator program 108A, 108B (FIG. 1) may provide results from the document classification, extraction and validation processes. Specifically, according to one embodiment, the provided results may include displaying the extracted and validated data as well as providing an indication of the classification rule applied to the document and data (as well as the classification rule suggestions), the data extraction rule applied to the data (as well as the data extraction rule suggestions), and the validation rules used in validating the data (as well as any generated rules and rule suggestions). It may be appreciated that FIGS. 1-3 provide only illustrations of one implementation and does not imply any limitations with regard to how different embodiments may be implemented. Many modifications to the depicted environments may be made based on design and implementation requirements.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
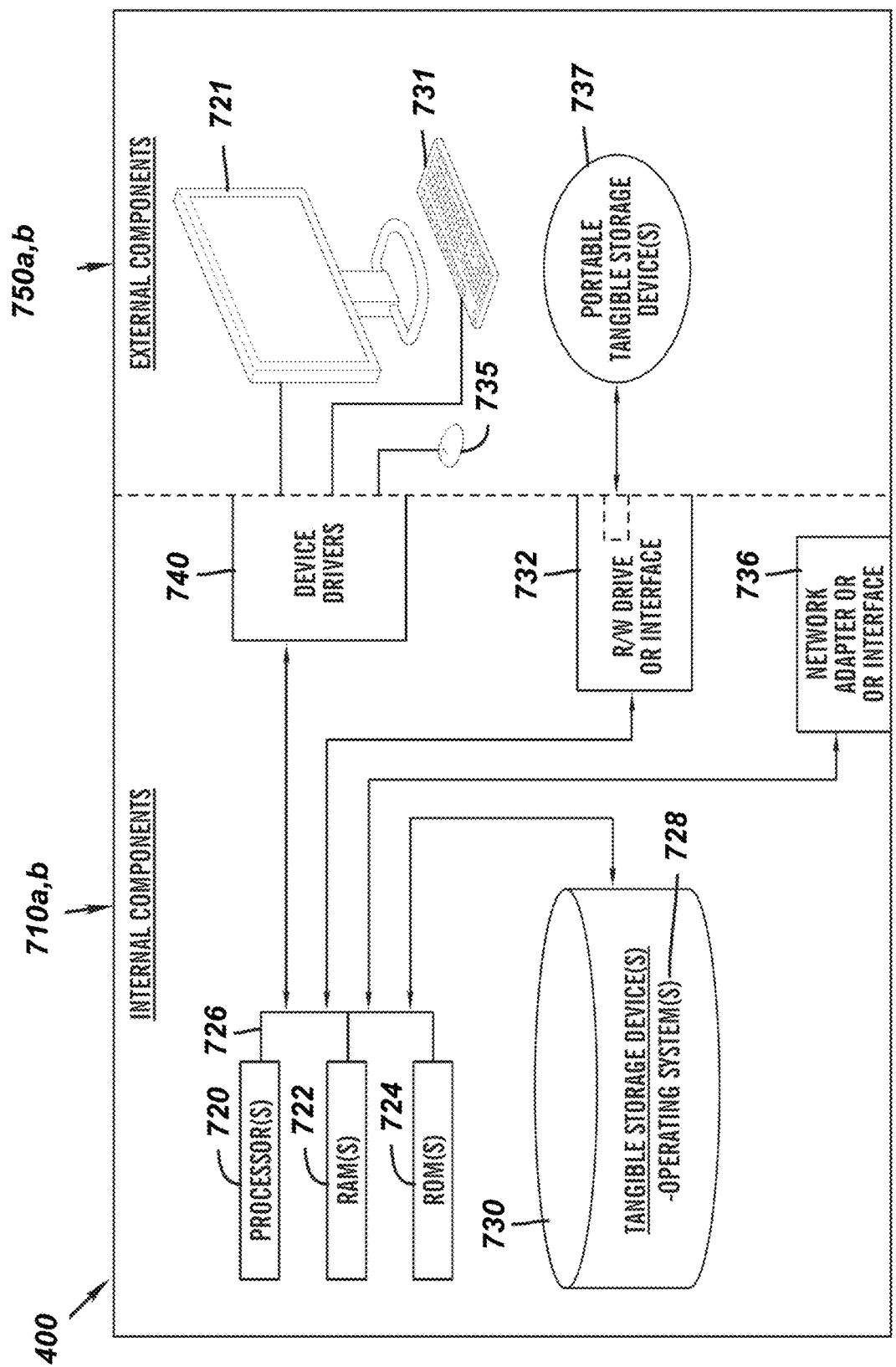
FIG. 4 is a block diagram of the system architecture of the program for automatically and predictively generating and/or updating rules for document classification, extraction, and validation according to one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 710, 750 is representative of any electronic device capable of executing machine-readable program instructions. Data processing system 710, 750 may be representative of a smart phone, a computer system, PDA, or other electronic devices. Examples of computing systems, environments, and/or configurations that may represented by data processing system 710, 750 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 710 a, b and external components 750 a, b illustrated in FIG. 4. Each of the sets of internal components 710 a, b includes one or more processors 720, one or more computer-readable RAMs 722, and one or more computer-readable ROMs 724 on one or more buses 726, and one or more operating systems 728 and one or more computer-readable tangible storage devices 730. The one or more operating systems 728, the software program 114 (FIG. 1) and the rule generator program 108A (FIG. 1) in client computer 102 (FIG. 1), and the rule generator program 108B (FIG. 1) in network server computer 112 (FIG. 1) are stored on one or more of the respective computer-readable tangible storage devices 730 for execution by one or more of the respective processors 720 via one or more of the respective RAMs 722 (which typically include cache memory). In the embodiment illustrated in FIG. 4, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 710 a, b, also includes a R/W drive or interface 732 to read from and write to one or more portable computer-readable tangible storage devices 737 such as a CD-ROM, DVD, memory stick, magnetic tape, magnetic disk, optical disk or semiconductor storage device. A software program, such as an rule generator program 108A and 108B (FIG. 1), can be stored on one or more of the respective portable computer-readable tangible storage devices 737, read via the respective R/W drive or interface 732, and loaded into the respective hard drive 730.

Each set of internal components 710 a, b also includes network adapters or interfaces 736 such as a TCP/IP adapter cards, wireless Wi-Fi interface cards, or 3G or 4G wireless interface cards or other wired or wireless communication links. The rule generator program 108A (FIG. 1) and software program 114 (FIG. 1) in client computer 102 (FIG. 1), and the rule generator program 108B (FIG. 1) in network server 112 (FIG. 1) can be downloaded to client computer 102 (FIG. 1) from an external computer via a network (for example, the Internet, a local area network or other, wide area network) and respective network adapters or interfaces 736. From the network adapters or interfaces 736, the rule generator program 108A (FIG. 1) and software program 114 (FIG. 1) in client computer 102 (FIG. 1) and the rule generator program 108B (FIG. 1) in network server computer 112 (FIG. 1) are loaded into the respective hard drive 730. The network may comprise copper wires, optical fibers, wireless transmission, routers, firewalls, switches, gateway computers, and/or edge servers.

Each of the sets of external components 750 a, b can include a computer display monitor 721, a keyboard 731, and a computer mouse 735. External components 750 a, b can also include touch screens, virtual keyboards, touch pads, pointing devices, and other human interface devices. Each of the sets of internal components 710 a, b also includes device drivers 740 to interface to computer display monitor 721, keyboard 731, and computer mouse 735. The device drivers 740, R/W drive or interface 732, and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
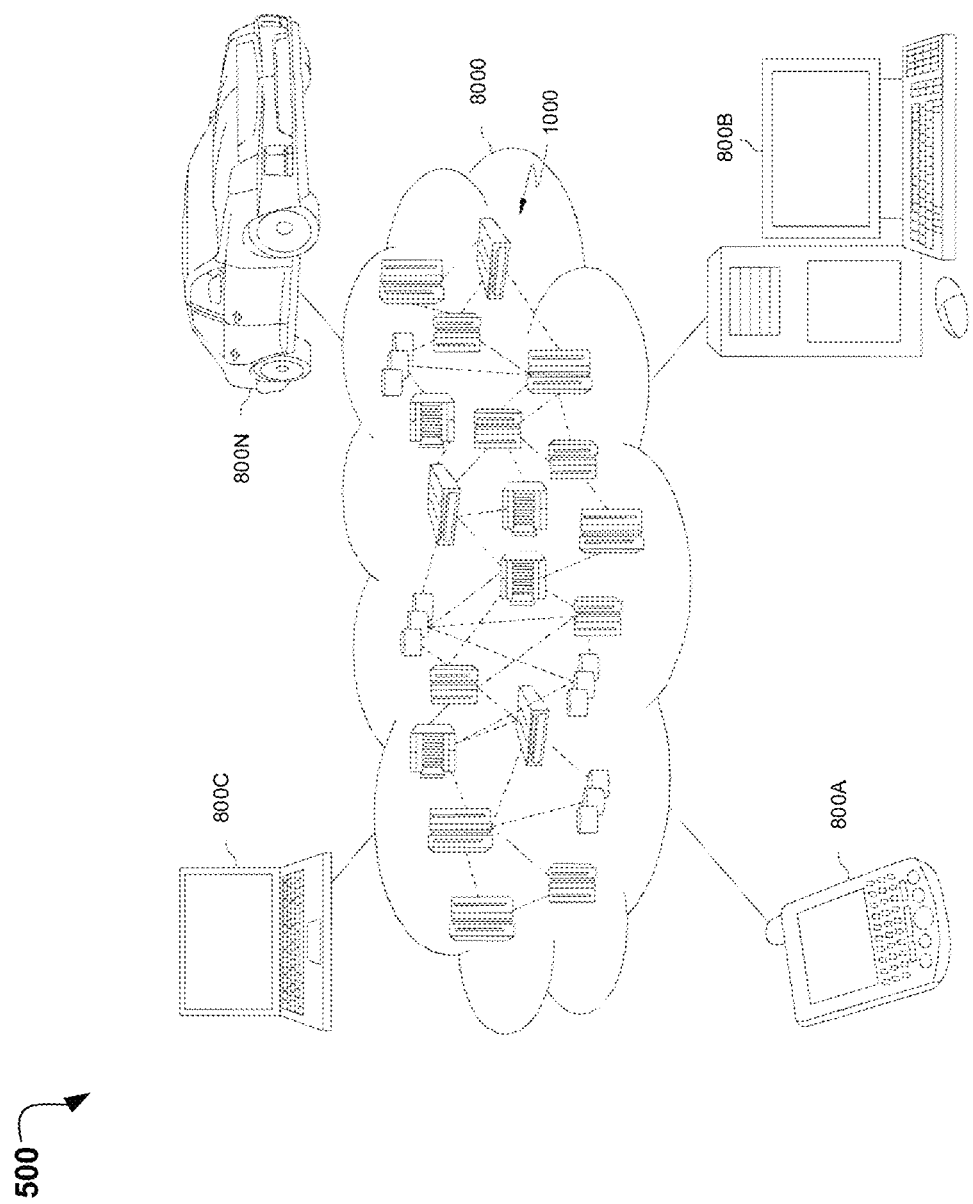
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 8000 comprises one or more cloud computing nodes 1000 with which local computing devices used by cloud consumers, such as, for example, personal digital assistant (PDA) or cellular telephone 800A, desktop computer 800B, laptop computer 800C, and/or automobile computer system 800N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 8000 to offer infrastructure, platforms and/or software as services for which a cloud consumer does not need to maintain resources on a local computing device. It is understood that the types of computing devices 800A-N shown in FIG. 5 are intended to be illustrative only and that computing nodes 100 and cloud computing environment 8000 can communicate with any type of computerized device over any type of network and/or network addressable connection (e.g., using a web browser).

Figure 6:
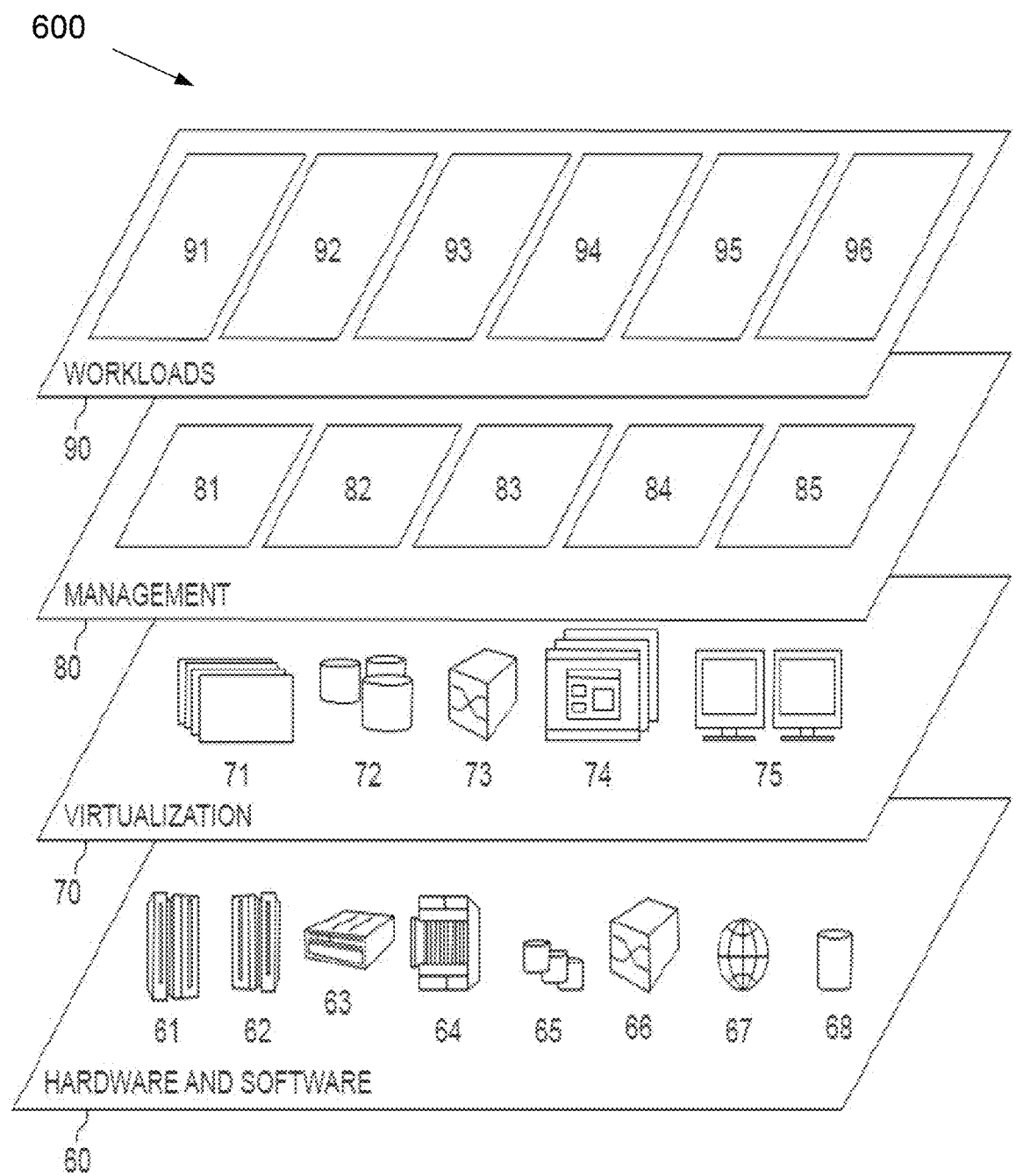
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 8000 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and rule generator 96. A rule generator program 108A, 108B (FIG. 1) may be offered "as a service in the cloud" (i.e., Software as a Service (SaaS)) for applications running on computing devices 102 (FIG. 1) and may automatically and predictively generating and/or updating rules for document classification and extraction, and more specifically, for document validation.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   in response to electronically receiving a document, automatically classifying the document, wherein automatically classifying the document comprises electronically identifying a document type associated with the document;
   based on the document type associated with the document, automatically classifying different parts of the document and electronically tagging data associated with the different parts of the document based on one or more classification rules pertaining to the identified document type and identified data type in the document, wherein automatically classifying the document and automatically classifying the different parts of the document further comprises automatically generating and applying one or more classification rule suggestions for classifying the document and the different parts of the document;
   in response to detecting first feedback associated with the one or more classification rule suggestions, updating the one or more classification rules corresponding to the one or more classification rule suggestions based on the first feedback, and applying the updated one or more classification rules;
   automatically extracting the tagged data associated with the automatically classified document based on one or more data extraction rules associated with the identified document type and the identified data type, wherein automatically extracting the tagged data associated with the automatically classified document based on one or more data extraction rules further comprises automatically generating and applying one or more data extraction rule suggestions for extracting the tagged data;
   in response to detecting second feedback associated with the one more data extraction rule suggestions, updating the one or more data extraction rules corresponding to the one more data extraction rule suggestions based on the second feedback, and applying the updated one or more data extraction rules; and
   automatically generating, updating, and applying validation rules based on the identified document type, the detected first feedback, and the detected second feedback to validate the automatically classified document and the automatically tagged and extracted data, wherein automatically generating and applying the validation rules further comprises automatically generating and applying one or more validation rule suggestions for validating the automatically classified document and the automatically tagged and extracted data.

2. The method of claim 1, wherein automatically classifying the document and the different parts of the document further comprises:
   generating the one or more classification rule suggestions based on the one or more classification rules; and
   applying at least one classification rule suggestion from the generated one or more classification rules suggestions based on a percentage threshold.

3. The method of claim 1, wherein automatically extracting the tagged data associated with the automatically classified document further comprises:
   generating the one or more data extraction rule suggestions based on the one or more data extraction rules; and
   applying at least one data extraction rule suggestion from the generated one or more data extraction rule suggestions based on a percentage threshold.

4. The method of claim 1, wherein detecting the first feedback associated with the one or more classification rules comprises detecting via a user interface at least one of a selection of a classification rule, an acceptance of a classification rule suggestion, a rejection of the classification rule suggestion, and a edit of the classification rule suggestion.

5. The method of claim 1, wherein detecting the second feedback associated with the one or more data extraction rules comprises detecting via a user interface at least one of a selection of a data extraction rule, an acceptance of a data extraction rule suggestion, a rejection of the data extraction rule suggestion, and a edit of the data extraction rule suggestion.

6. The method of claim 1, further comprising:
   detecting third feedback, wherein the third feedback comprises data corrections to the automatically tagged and extracted data.

7. The method of claim 1, further comprising:
   automatically generating and updating the validation rules based on at least one of a type of industry associated with the document, an originating geography associated with the document, a company associated with the document.

8. A computer system, comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   in response to electronically receiving a document, automatically classifying the document, wherein automatically classifying the document comprises electronically identifying a document type associated with the document;
   based on the document type associated with the document, automatically classifying different parts of the document and electronically tagging data associated with the different parts of the document based on one or more classification rules pertaining to the identified document type and identified data type in the document, wherein automatically classifying the document and automatically classifying the different parts of the document further comprises automatically generating and applying one or more classification rule suggestions for classifying the document and the different parts of the document;

in response to detecting first feedback associated with the one or more classification rule suggestions, updating the one or more classification rules corresponding to the one or more classification rule suggestions based on the first feedback, and applying the updated one or more classification rules;

automatically extracting the tagged data associated with the automatically classified document based on one or more data extraction rules associated with the identified document type and the identified data type, wherein automatically extracting the tagged data associated with the automatically classified document based on one or more data extraction rules further comprises automatically generating and applying one or more data extraction rule suggestions for extracting the tagged data;

in response to detecting second feedback associated with the one more data extraction rule suggestions, updating the one or more data extraction rules corresponding to the one more data extraction rule suggestions based on the second feedback, and applying the updated one or more data extraction rules; and automatically generating, updating, and applying validation rules based on the identified document type, the detected first feedback, and the detected second feedback to validate the automatically classified document and the automatically tagged and extracted data, wherein automatically generating and applying the validation rules further comprises automatically generating and applying one or more validation rule suggestions for validating the automatically classified document and the automatically tagged and extracted data.

9. The computer system of claim 8, wherein automatically classifying the document and the different parts of the document further comprises:
generating the one or more classification rule suggestions based on the one or more classification rules; and
applying at least one classification rule suggestion from the generated one or more classification rules suggestions based on a percentage threshold.

10. The computer system of claim 8, wherein automatically extracting the tagged data associated with the automatically classified document further comprises:
generating the one or more data extraction rule suggestions based on the one or more data extraction rules; and
applying at least one data extraction rule suggestion from the generated one or more data extraction rule suggestions based on a percentage threshold.

11. The computer system of claim 8, wherein detecting the first feedback associated with the one or more classification rules comprises detecting via a user interface at least one of a selection of a classification rule, an acceptance of a classification rule suggestion, a rejection of the classification rule suggestion, and a edit of the classification rule suggestion.

12. The computer system of claim 8, wherein detecting the second feedback associated with the one or more data extraction rules comprises detecting via a user interface at least one of a selection of a data extraction rule, an acceptance of a data extraction rule suggestion, a rejection of the data extraction rule suggestion, and a edit of the data extraction rule suggestion.

13. The computer system of claim 8, further comprising:
detecting third feedback, wherein the third feedback comprises data corrections to the automatically tagged and extracted data.

14. The computer system of claim 8, further comprising:
automatically generating and updating the validation rules based on at least one of a type of industry associated with the document, an originating geography associated with the document, a company associated with the document.

15. A computer program product for automatically detecting and concealing content associated with a notification in response to receiving and presenting the notification on a computing device, comprising:
one or more tangible computer-readable storage media and program instructions stored on at least one of the one or more tangible computer-readable storage media, the program instructions executable by a processor, the program instructions comprising:
in response to electronically receiving a document, automatically classifying the document, wherein automatically classifying the document comprises electronically identifying a document type associated with the document;
based on the document type associated with the document, automatically classifying different parts of the document and electronically tagging data associated with the different parts of the document based on one or more classification rules pertaining to the identified document type and identified data type in the document, wherein automatically classifying the document and automatically classifying the different parts of the document further comprises automatically generating and applying one or more classification rule suggestions for classifying the document and the different parts of the document;
in response to detecting first feedback associated with the one or more classification rule suggestions, updating the one or more classification rules corresponding to the one or more classification rule suggestions based on the first feedback, and applying the updated one or more classification rules;
automatically extracting the tagged data associated with the automatically classified document based on one or more data extraction rules associated with the identified document type and the identified data type, wherein automatically extracting the tagged data associated with the automatically classified document based on one or more data extraction rules further comprises automatically generating and applying one or more data extraction rule suggestions for extracting the tagged data;
in response to detecting second feedback associated with the one more data extraction rule suggestions, updating the one or more data extraction rules corresponding to the one more data extraction rule suggestions based on the second feedback, and applying the updated one or more data extraction rules; and automatically generating, updating, and applying validation rules based on the identified document type, the detected first feedback, and the detected second feedback to validate the automatically classified document and the automatically tagged and extracted data, wherein automatically generating and applying the validation rules further comprises automatically generating and applying one or more validation rule suggestions for validating the automatically classified document and the automatically tagged and extracted data.

16. The computer program product of claim 15, wherein the program instructions to automatically classify the document and the different parts of the document further comprises program instructions to:
generate the one or more classification rule suggestions based on the one or more classification rules; and
apply at least one classification rule suggestion from the generated one or more classification rules suggestions based on a percentage threshold.

17. The computer program product of claim 15, wherein the program instructions to automatically extract the tagged data associated with the automatically classified document further comprises program instructions to:
generate the one or more data extraction rule suggestions based on the one or more data extraction rules; and
apply at least one data extraction rule suggestion from the generated one or more data extraction rule suggestions based on a percentage threshold.

18. The computer program product of claim 15, wherein the program instructions to detect the first feedback associated with the one or more classification rules comprises program instructions to detect via a user interface at least one of a selection of a classification rule, an acceptance of a classification rule suggestion, a rejection of the classification rule suggestion, and a edit of the classification rule suggestion.

19. The computer program product of claim 15, wherein the program instructions to detect the second feedback associated with the one or more data extraction rules comprises program instructions to detect via a user interface at least one of a selection of a data extraction rule, an acceptance of a data extraction rule suggestion, a rejection of the data extraction rule suggestion, and a edit of the data extraction rule suggestion.

20. The computer program product of claim 15, further comprising program instructions to:
detect third feedback, wherein the third feedback comprises data corrections to the automatically tagged and extracted data.

* * * * *